US012734777B2

(12) United States Patent
Rodwell et al.

(10) Patent No.: US 12,734,777 B2
(45) Date of Patent: Sep. 15, 2026

(54) METHOD OF MANUFACTURING A SHELL OF A WIND TURBINE BLADE

(71) Applicant: LM WIND POWER A/S, Kolding (DK)

(72) Inventors: Andrew M. Rodwell, New Orleans, LA (US); Jasper Knoblock, New Orleans, LA (US); Scott Huth, New Orleans, LA (US); Thomas Merzhaeuser, Kolding (DK); Paul Trevor Hayden, Hampshire (GB)

(73) Assignee: LM Wind Power A/S, Kolding (DK)

( * ) Notice: Subject to any disclaimer, the term of this patent is extended or adjusted under 35 U.S.C. 154(b) by 180 days.

(21) Appl. No.: 18/286,069

(22) PCT Filed: Apr. 7, 2022

(86) PCT No.: PCT/EP2022/059266

§ 371 (c)(1),
(2) Date: Oct. 6, 2023

(87) PCT Pub. No.: WO2022/214593

PCT Pub. Date: Oct. 13, 2022

(65) Prior Publication Data

US 2024/0227337 A1 Jul. 11, 2024

(30) Foreign Application Priority Data

Apr. 7, 2021 (EP) .................................... 21167215

(51) Int. Cl.
*B29D 99/00* (2010.01)
*F03D 1/06* (2006.01)
(Continued)

(52) U.S. Cl.
CPC ....... *B29D 99/0028* (2013.01); *F03D 1/0682* (2023.08); *B29C 70/44* (2013.01);
(Continued)

(58) Field of Classification Search
CPC ........... B29D 99/0028; B29L 2031/085; B29L 2031/082; F05B 2240/302; F05B 2230/23;
(Continued)

(56) References Cited

U.S. PATENT DOCUMENTS 7,179,059 B2 * 2/2007 Sorensen .............. F03D 1/0675 416/233
7,895,745 B2 * 3/2011 Althoff ................. F03D 1/0675 29/889.71

(Continued)

FOREIGN PATENT DOCUMENTS

CN 106286116 A 1/2017
EP 3787883 B1 * 9/2023 ........... B29C 70/443

(Continued)

OTHER PUBLICATIONS

PCT International Search Report & Opinion PCT/EP2022/059266 on Sep. 19, 2022.

*Primary Examiner* — Sang K Kim
(74) *Attorney, Agent, or Firm* — Dority & Manning, P.A.

(57) ABSTRACT

A method of manufacturing a shell of a wind turbine blade is disclosed. The method of manufacturing includes laying one or more layers of fiber on a surface of mould to form the shell. A spar element is positioned at a pre-defined position on the one or more layers of fiber, and a vacuum bag is positioned or covered around the one or more layers of fiber and the spar element. The method further includes step of infusion of resin through the one or more layers of fiber and the spar element. The resin is subsequently allowed to cure to obtain the shell of the wind turbine blade. The spar element is thus adhered to the shell through resin infusion process.

13 Claims, 12 Drawing Sheets

Figure 1:
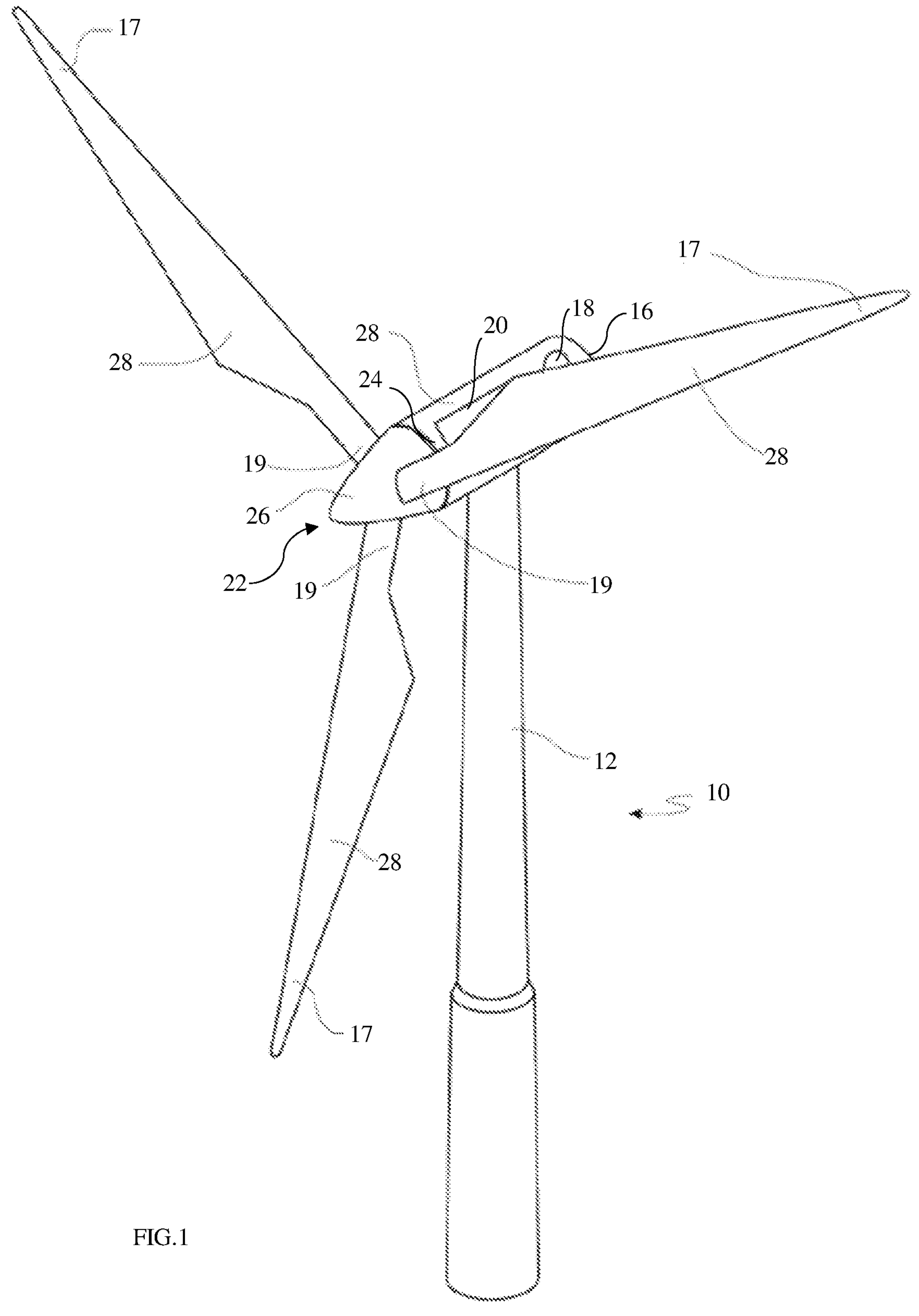

(51) Int. Cl.

| | |
|---|---|
| *B29C 70/44* | (2006.01) |
| *B29K 63/00* | (2006.01) |
| *B29K 307/04* | (2006.01) |
| *B29L 31/08* | (2006.01) |

(52) U.S. Cl.
CPC ...... *B29K 2063/00* (2013.01); *B29K 2307/04* (2013.01); *B29L 2031/085* (2013.01); *F05B 2230/23* (2013.01)

(58) Field of Classification Search
CPC ..... B29C 70/342; B29C 70/44; B29C 70/548; B29K 2063/00; B29K 2307/04; F03D 1/0675; F03D 1/0677; F03D 1/0679; F03D 1/0681; F03D 1/0682; F03D 1/0684; F05D 2240/302
See application file for complete search history.

(56) References Cited

U.S. PATENT DOCUMENTS

| | | | | |
|---|---|---|---|---|
| 8,167,569 | B2 * | 5/2012 | Livingston | F03D 1/0675 416/224 |
| 10,071,532 | B2 * | 9/2018 | Caruso | F03D 80/00 |
| 10,118,321 | B2 * | 11/2018 | Witte | B29C 70/44 |
| 10,584,678 | B2 * | 3/2020 | Caruso | F03D 1/0675 |
| 10,954,915 | B2 * | 3/2021 | Smith | F03D 1/0675 |
| 11,072,129 | B2 * | 7/2021 | Hedges | B29C 66/9121 |
| 11,073,129 | B2 * | 7/2021 | Schibsbye | B29C 65/70 |
| 12,168,331 | B2 * | 12/2024 | Biegel | B29C 33/76 |
| 2011/0254189 | A1 * | 10/2011 | Doyle | C04B 26/02 264/219 |
| 2013/0216388 | A1 * | 8/2013 | Akhtar | F03D 1/0675 29/428 |
| 2014/0064980 | A1 * | 3/2014 | Griesel | F03D 1/0675 156/305 |
| 2014/0271217 | A1 * | 9/2014 | Baker | F03D 1/0633 416/226 |
| 2015/0251370 | A1 * | 9/2015 | Kirkeby | B29C 70/46 156/196 |
| 2015/0369211 | A1 * | 12/2015 | Merzhaeuser | F03D 17/00 416/61 |
| 2016/0040651 | A1 * | 2/2016 | Yarbrough | B29C 70/0035 156/245 |
| 2024/0001632 | A1 * | 1/2024 | Arias | B29C 70/541 |

FOREIGN PATENT DOCUMENTS

| | | | |
|---|---|---|---|
| WO | WO2014/096002 | A2 | 6/2014 |
| WO | WO2020/122870 | A1 | 6/2020 |

* cited by examiner

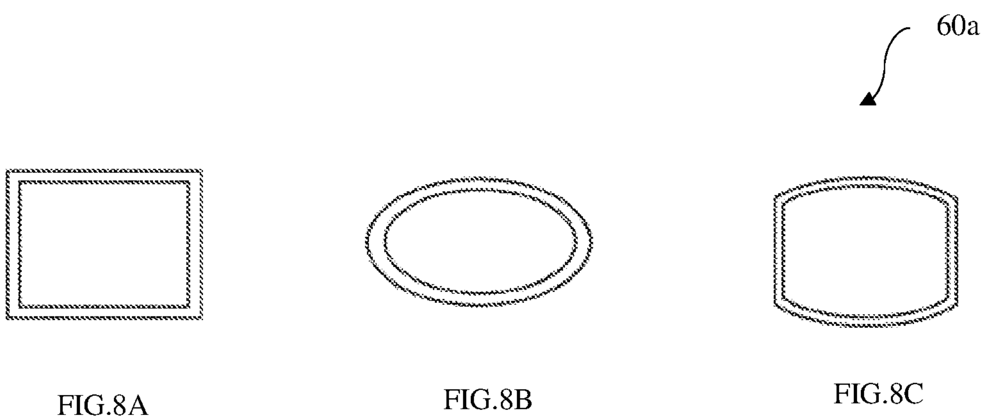
FIG.8A
FIG.8B
FIG.8C
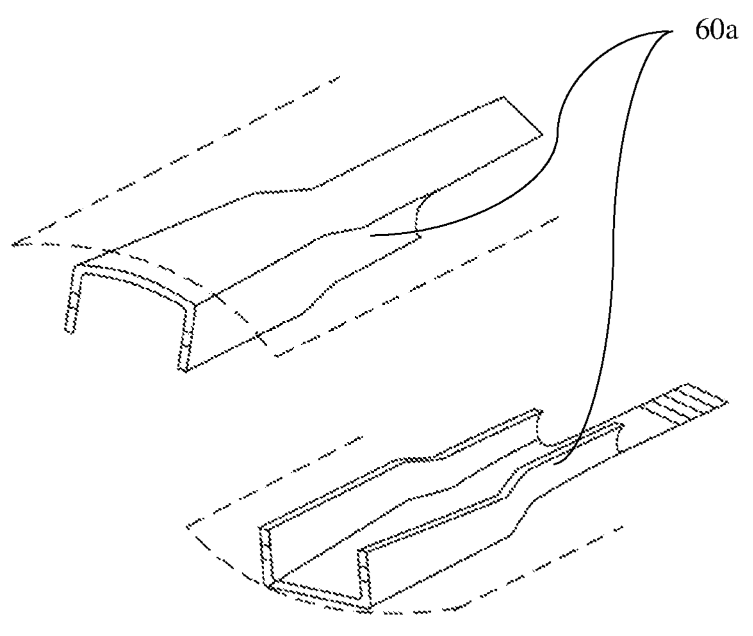
FIG.8D

METHOD OF MANUFACTURING A SHELL OF A WIND TURBINE BLADE

This is a National Phase Application filed under 35 U.S.C. 371 as a national stage of PCT/EP2022/059266, filed Apr. 7, 2022, an application claiming priority of European Application No. 21167215.9, filed Apr. 7, 2021, the content of each of which is hereby incorporated by reference in its entirety.

FIELD OF THE INVENTION

The present invention relates to a wind turbine blade. Further embodiments, of the disclosure discloses about the method of manufacturing a shell of the wind turbine blade. In addition, the present invention relates to methods of joining a spar element to the shell of the blade during manufacturing said blade using resin infusion process.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. The blade components such as spar receiving sections (e.g. for sectionized blades), beam structures, shear webs and the like are conventionally adhered to the shells by bonding pastes such as adhesives. These bonding pastes would the defining a typical bonding line on the shell of the wind turbine blade. The bond lines of typical rotor blades are generally formed by applying a suitable bonding paste (i.e. adhesives) or compound along the bond line with a minimum designed bond width between the shell members. These bonding lines are a critical design constraint of the blades as a significant number of turbine blade field failures occur at the bond-line. Also, the use of bonding paste to adhere components of the wind turbine blade such as the spar element, shear webs and other blade components that are mentioned above, which lead to catastrophic failure of the blades over a period of time. At the joint portions of the blade the concentrated load transfer makes the connection more demanding, and the limitations of the weak adhesive connections limit the design capability and add risk of failure. Also, use of such bonding paste over the blade of wind turbine reduces or limits the design features due to the high concentrated loads.

An additional concern when joining components of a rotor blade together is maintaining the aerodynamic contour of the rotor blade. In many cases, due the complexity of the joining process, the aerodynamic contour of one or more components being joined can be altered from a desirable aerodynamic contour for that component. For example, an adhesive connection consists of two structural layers each capable of carrying the primary loads and the adhesive that transfers the load. Typical adhesive connections are 5-15 mm thick, when combined with the additional structure can add 25 mm to each side of the blade compared to a comparable non-bonded method. Either the internal structural space is limited, resulting in a shorter blade than possible, or the blade must be thicker to accommodate the extra material, resulting in decreased aerodynamic performance. Either current approach decreases turbine annual energy production (AEP) by 2 to 5%, with a typical contemporary turbine providing a business and customer value of $100,000 per 1% of AEP Accordingly, improved systems and methods for joining blade components of rotor blades are desired. In particular, systems and methods which reduce the time and expense associated with joining of the blade components, and which maintain the aerodynamic contour of the rotor blade, would be advantageous.

SUMMARY OF THE INVENTION

One or more shortcomings of the conventional methods are overcome by the methods as claimed and additional advantages are provided through the provision of assembly as claimed in the present invention.

Additional features and advantages are realized through the techniques of the present invention. Other embodiments and aspects of the disclosure are described in detail herein and are considered as a part of the claimed disclosure.

In one non-limiting embodiment of the disclosure, a method of manufacturing a shell of a wind turbine blade is disclosed. The method of manufacturing includes laying one or more layers of shell or spar fibers on a surface of mould to form a portion of the blade shell. The shell of the wind turbine blade includes a first shell half structure and a second shell half structure. A spar element is positioned at a pre-defined position on the one or more layers of fiber. The term pre-defined position may be construed as a positioning of the shear web at a substantially central portion of the first shell half structure and/or the second shell half structure. It should be understood that the spar element may also be positioned on the second shell half structure of the root end segment of the blade 28 and may be adhered to the second shell half structure. The spar element is positioned on at least one of the first shell half structure and the second shell half structure. A vacuum bag is positioned or covered around the one or more layers of fiber and the spar element. The vacuum bag is configured to seal the spar element and the one or more layers of fiber. A resin is infused through the one or more layers of fiber and the spar elements. Upon infusing the resin through the vacuum bag and through the one or more layers of fiber and spar element, the resin is subsequently allowed to cure to obtain the first shell half structure and the second shell half structure. In the process of infusing the resin through the one or more fiber and spar element and curing the resin, the spar element is adhered to the shell i.e. at least one of the first shell half structure or the second shell half structure. It is clear that the shell or spar fibers refers to layers of fibers. The shell fiber (or shell fiber layers) may form part of an aerodynamic shell, and the spar fibers (or spar fiber layers) may form part of the spar construction, e.g. at least part of a spar cap. It is further clear that the reference to the one or more layers of fibers refer to the shell or spar fibers (or shell fiber layer(s) or spar fiber layer(s)).

The spar element is preferably a pre-manufactured part, such as a precured composite structure.

In a preferred embodiment of the disclosure, the spar element is a spar beam receiver box, or section thereof.

In a preferred embodiment of the disclosure, the resin includes a polyester compound. The polyester compound is preferably at least one of a vinyl ester or epoxy resins.

In certain embodiment of the disclosure includes positioning a shear web at a substantially central portion of the shell. The shear web extends along length of the shell up to the position of the spar element. The end of the shear webs proximal to the spar element is connected to the shear web. In other words, the shear web of the main blade section is connected to the shear web of the spar element. The shear web is preferably pre-manufactured part, such as a precured composite structure.

In a preferred embodiment of the disclosure, the resin is infused through a vacuum infusion process.

In another non-limiting embodiment of the disclosure, a method for joining a spar element to a wind turbine blade part (or joining a spar element to blade shell) is disclosed. The method includes positioning the shell of the wind turbine blade on a mould. The shell of the wind turbine blade includes at least one of a first shell half structure or a second shell half structure. A spar element is positioned at a pre-defined position over the at least one of the first shell half structure or the second shell half structure or spar cap of the wind turbine blade. A portion of the spar element that is in contact with the shell (i.e. at least one of the first shell half structure and the second shell half structure) or the spar cap is defined with a flow path. Resin is infused between the spar element and the shell or the spar cap. The resin is infused through the flow path and is subsequently cured, thereby adhering the spar element to the shell or the spar cap.

In a preferred embodiment of the disclosure, the one or more layers of fibers on the mould are glass fibers In another embodiment, the one or more layers of fibers are carbon fibers or carbon-glass hybrid layers.

In another non-limiting embodiment of the disclosure, a method for manufacturing a root end of the wind turbine blade is disclosed. The method includes forming a first shell half structure and a second shell half structure separately in a mould. A spar element is joined to at least one of the first shell half structure and the second shell half structure by resin infusion process in the mould. Positioning a shear web at a substantially central portion of the first shell half structure and the second shell half structure. The shear web extends in a spanwise direction up to the spar element. The method further includes joining an end of the spar element and the shear web by resin infusion process. The first shell half structure and the second shell half structure are joined and sealed together to obtain root end of the wind turbine blade.

In a preferred embodiment, the spar element is bonded to the remaining of the first shell half structure or the second shell half structure before joining of the first shell half structure and the second shell half structure.

In a preferred embodiment of the disclosure, the first shell half structure and the second shell half structure are formed by laying plurality of layers of fiber in the mould and infusing resin and subsequently curing the resin.

In a preferred embodiment of the disclosure, a first half of the spar element is bonded to the first shell half structure and a second half of the spar element is bonded to the second shall half structure. The first half and second half of the spar element is bonded to each other before joining the first shell half structure and the second shell half structure. The first half and/or the second half of the spar element are preferably pre-fabricated parts, such as precured composite structures.

As used herein, the term "spanwise" is used to describe the orientation of a measurement or element along the blade from its root end to its tip end. In some embodiments, spanwise is the direction along the longitudinal axis and longitudinal extent of the wind turbine blade. The term "chordwise" is used to describe the orientation of a measurement or element from its leading edge to its trailing edge. In some embodiments, chordwise is the direction along the lateral axis and lateral extent of the wind turbine blade It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE INVENTION

Figures 2, 3:
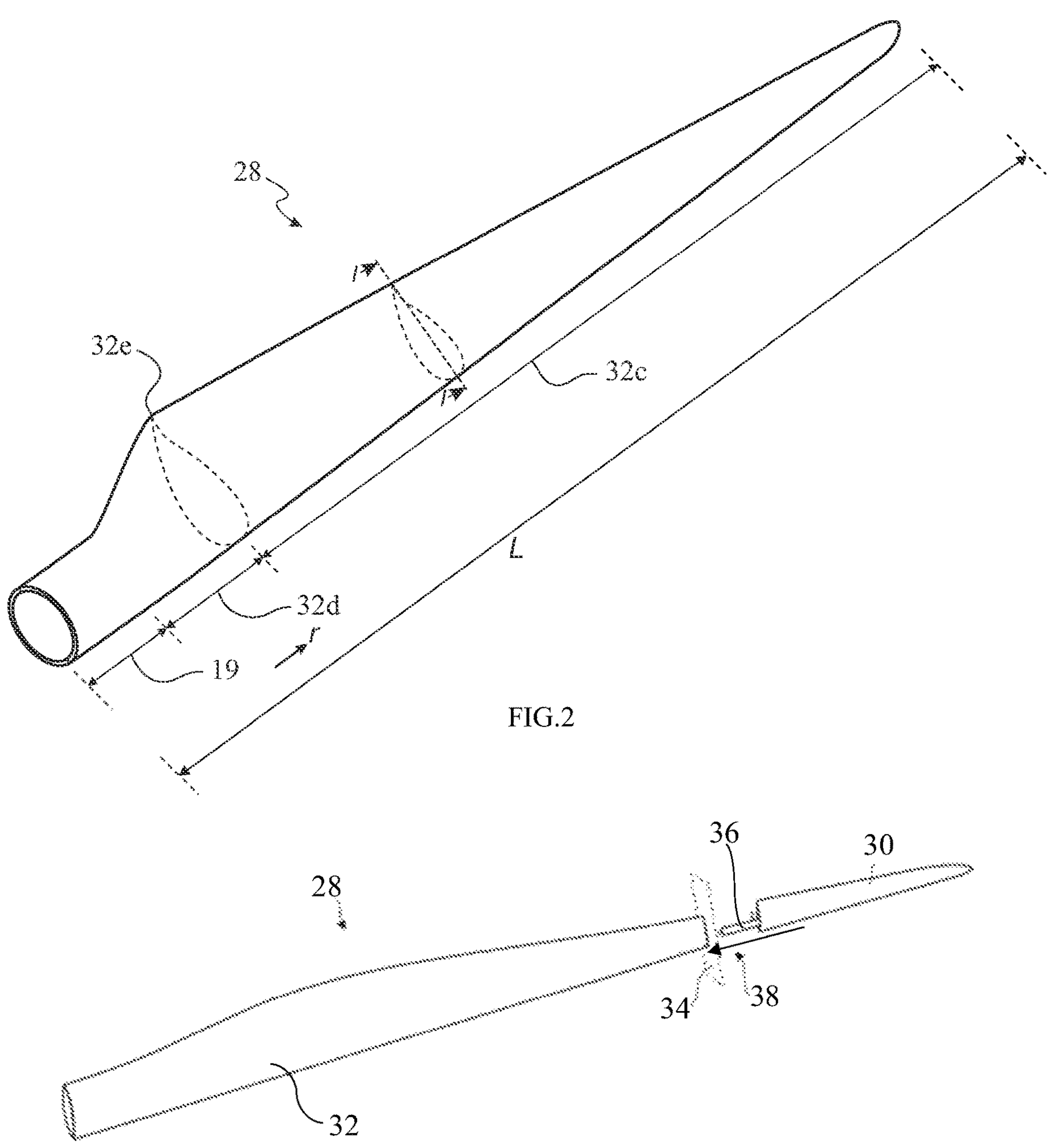
Figure 4:
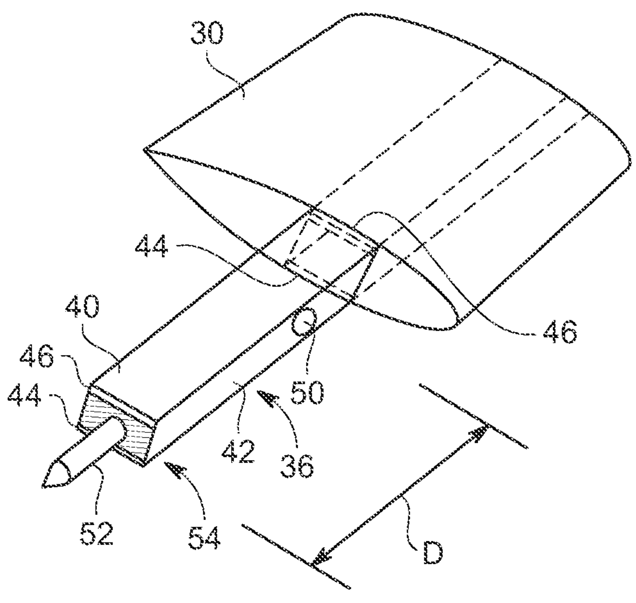
Figure 5:
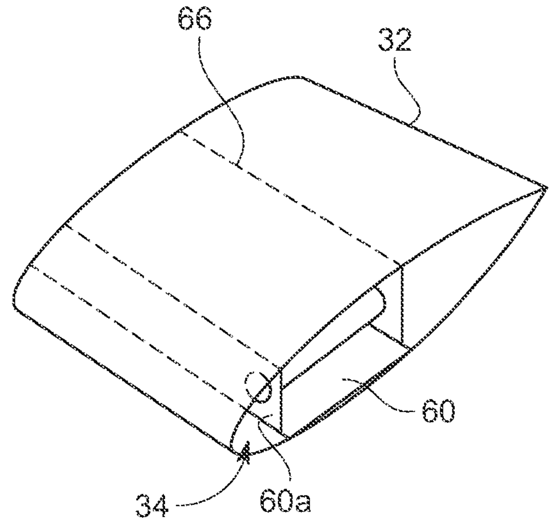
Figure 6:
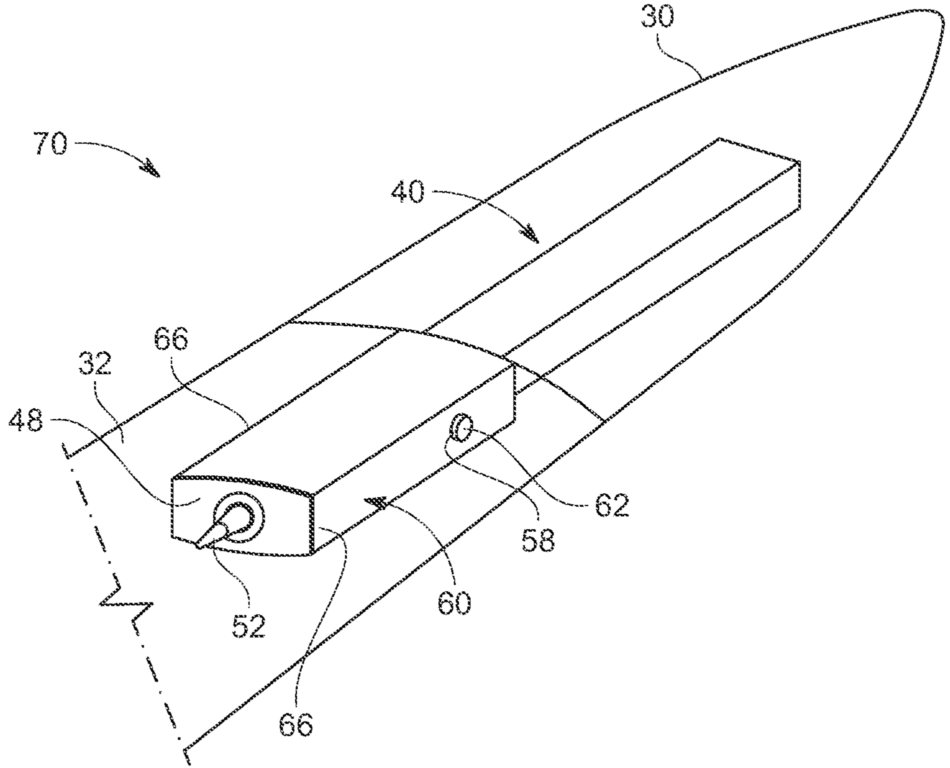
Figure 7:
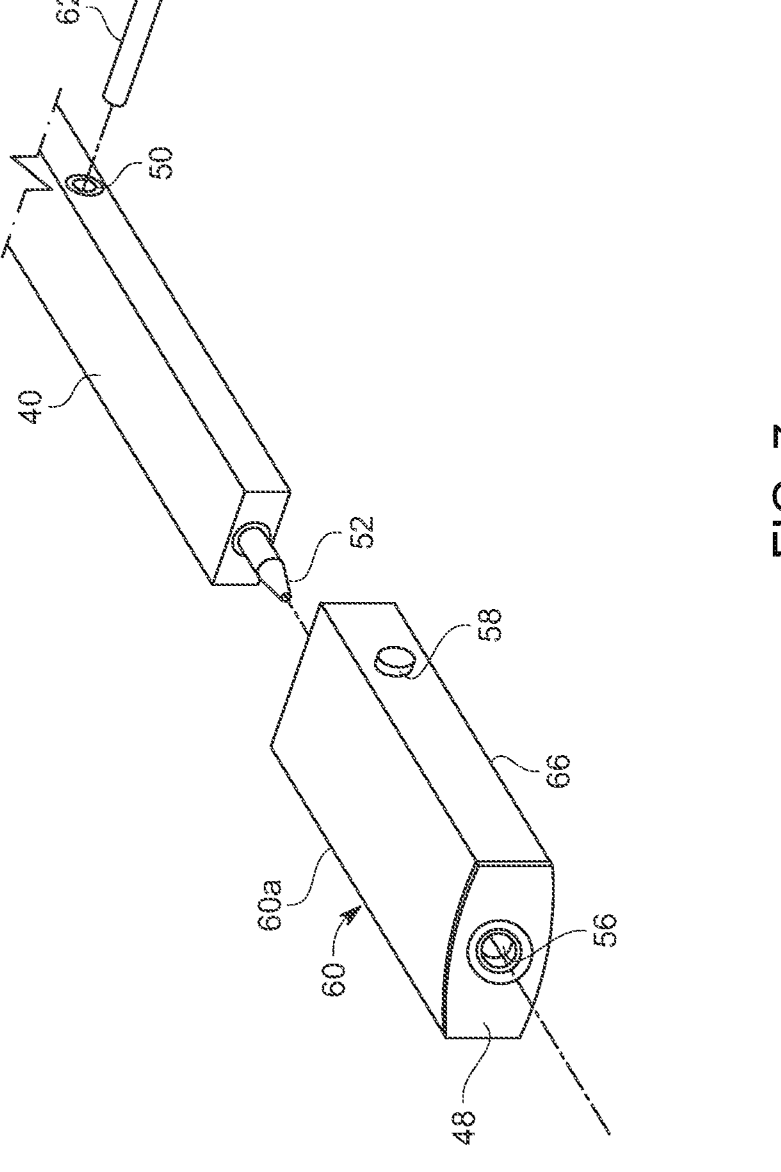
Figure 9:
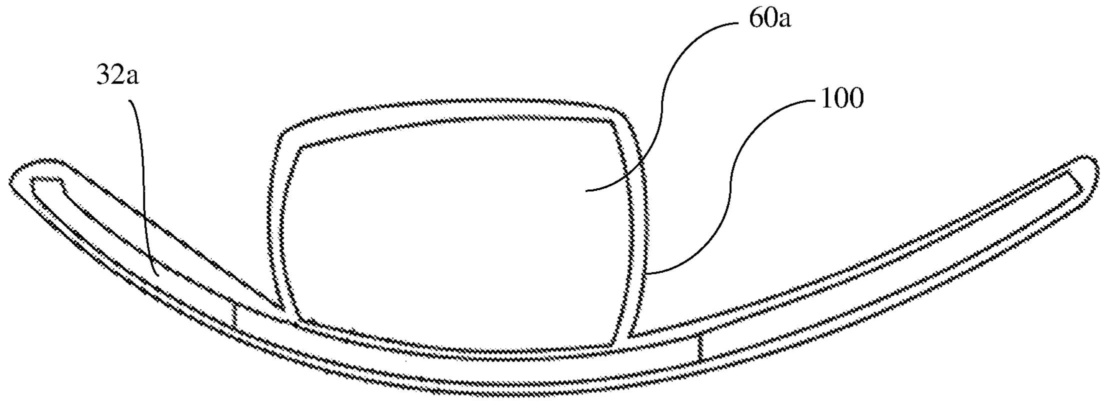
Figure 10:
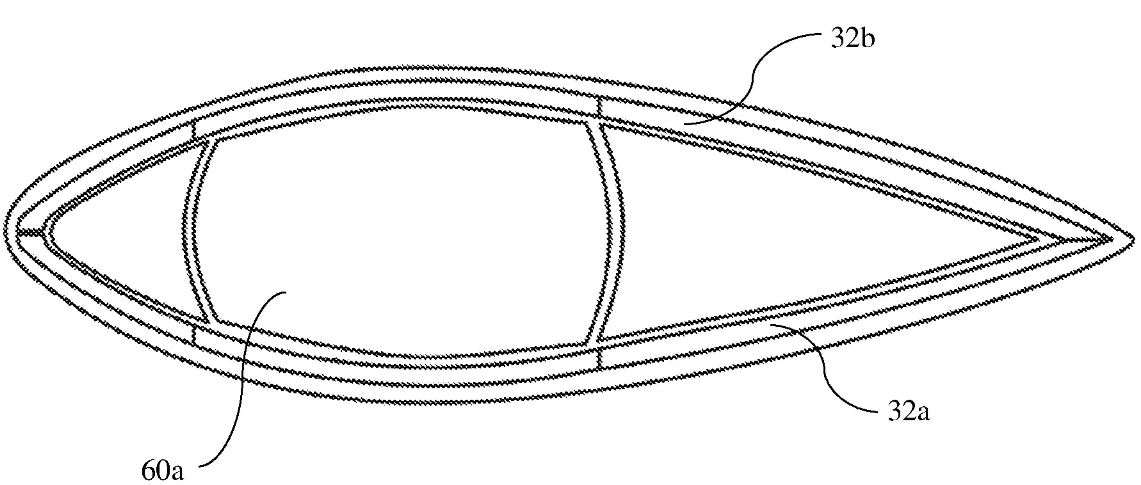
Figure 11A:
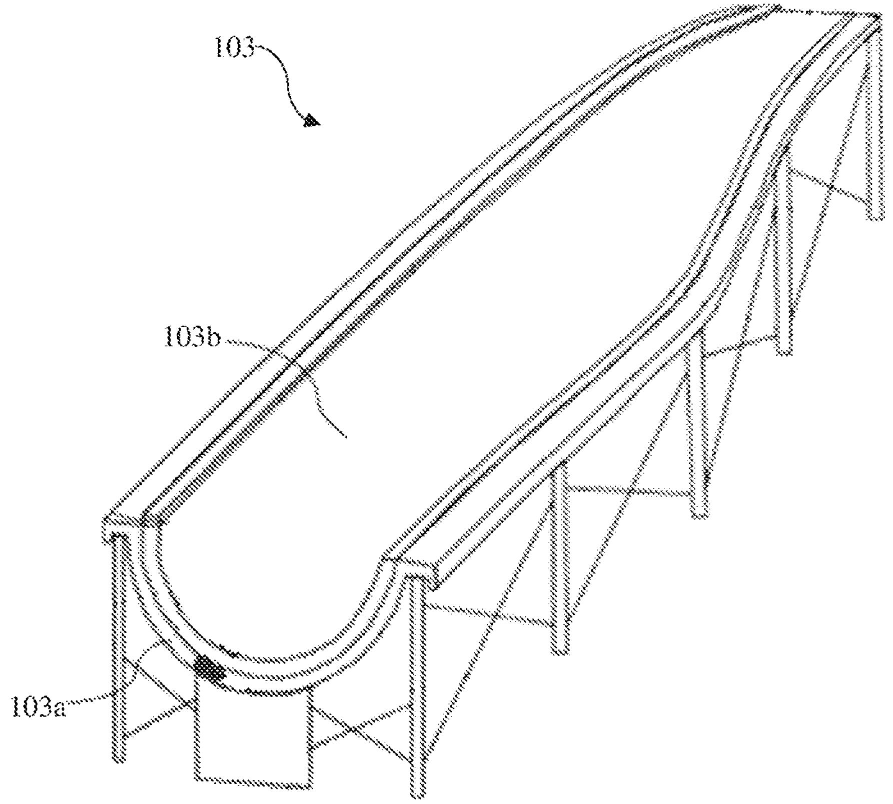
Figure 11B:
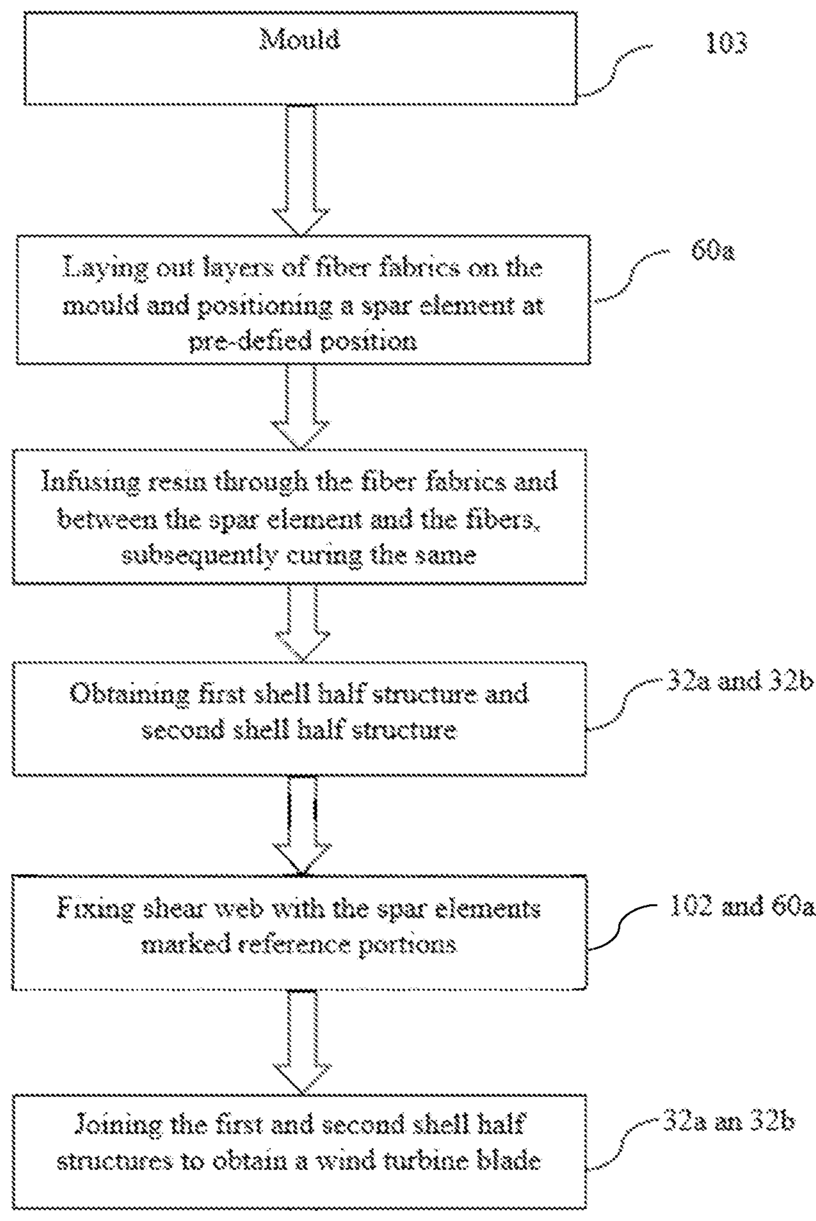
Figure 11C:
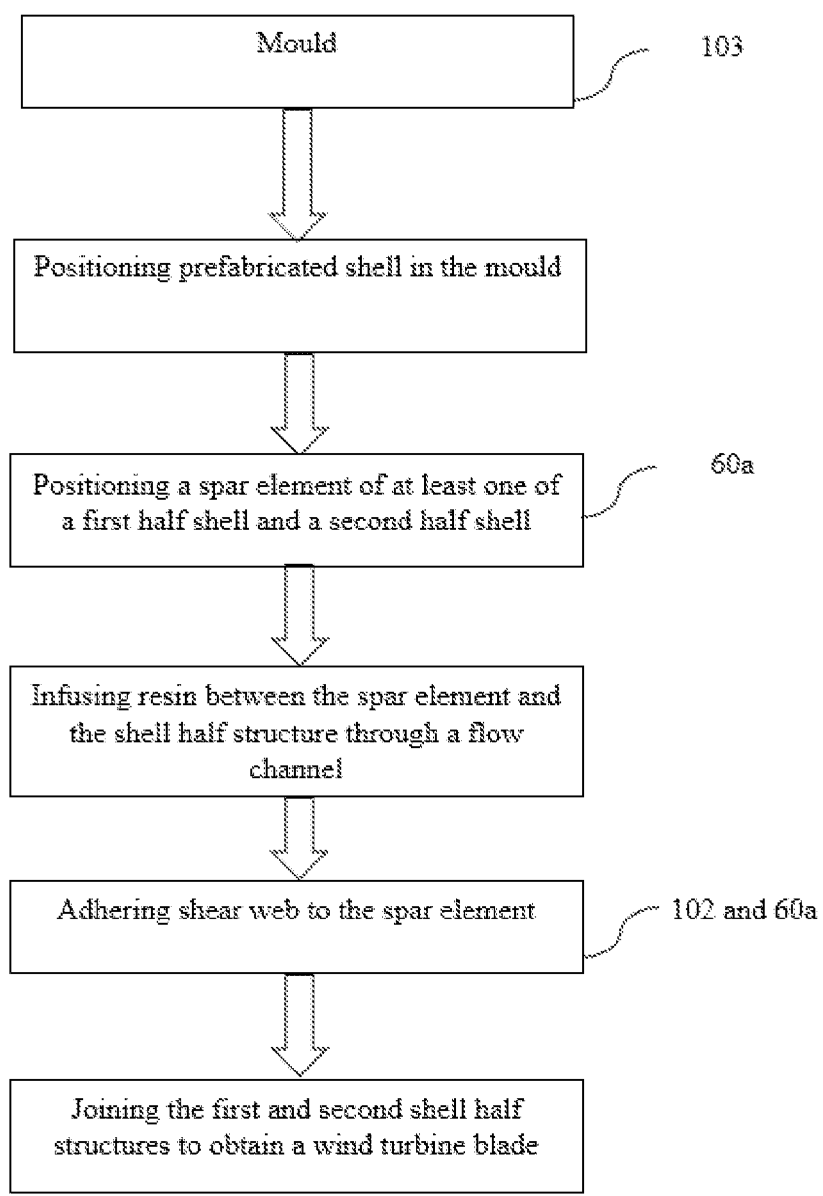
Figure 12:
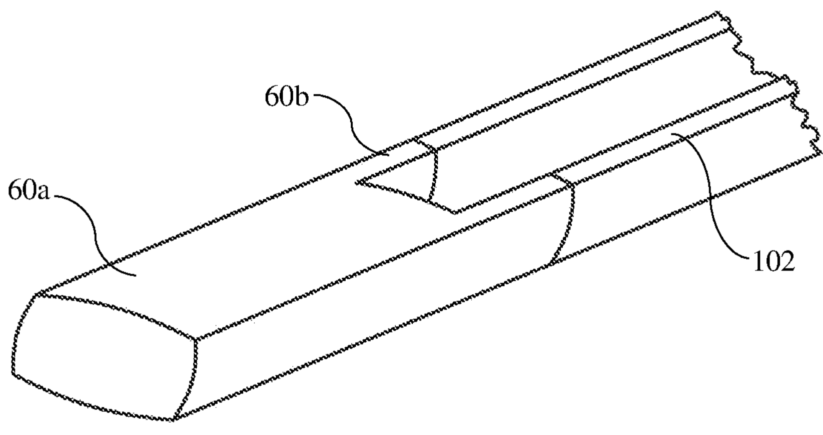
Figure 13:
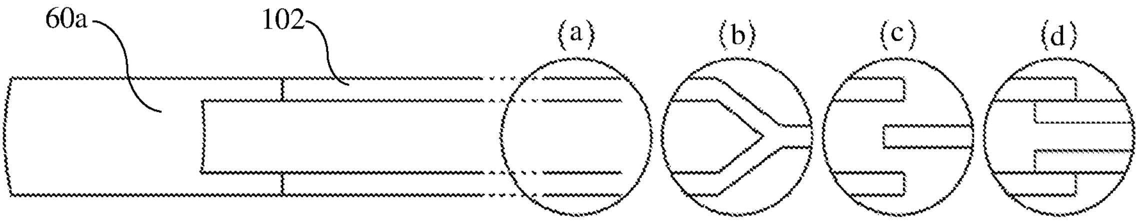
Figure 14:
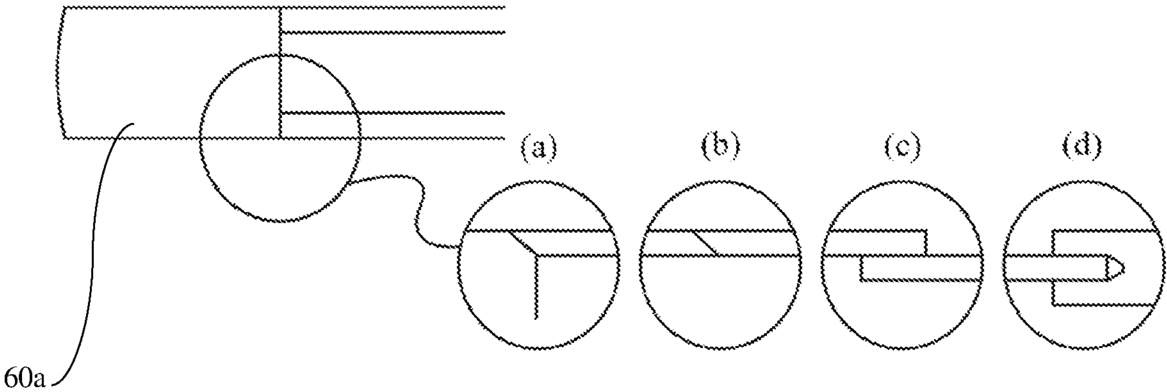

The invention is explained in detail below with reference to an embodiment shown in the drawings, in which FIG. 1 illustrates a perspective view of one embodiment of a wind turbine, FIG. 2 illustrates a perspective view of a wind turbine blade, in accordance with an embodiment of the disclosure, FIG. 3 illustrates a plan view of one embodiment of a rotor blade having a first blade segment and a second blade segment, FIG. 4 illustrates a perspective view of a section of one embodiment of tip end of the blade, FIG. 5 illustrates a perspective view of one embodiment of a section of the root end of the blade at the chord-wise joint, FIG. 6 illustrates an assembly of one embodiment of the rotor blade of the wind turbine having a tip end joined to with the root end segment, FIG. 7 illustrate an exploded perspective view of one embodiment of the multiple supporting structures of the assembly of the rotor blade of the wind turbine;

FIGS. 8*a-d* illustrates different cross-sections of the receiving section of the spar element;

FIGS. 9 and 10 illustrates step-by-step method of joining a spar element to the shell of the wind turbine blade by resin infusion process;

FIG. 11*a* illustrates a perspective view of a mould used to manufacture the shell of the wind turbine blade by resin infusion process, in accordance with an embodiment of the disclosure, FIGS. 11*b* and 11*c* is a flowchart of the method of manufacturing a wind turbine blade, in accordance with an embodiment of the present disclosure FIG. 12 illustrates schematic view of the spar element connected to the shear web of the wind turbine blade by resin infusion process; and FIGS. 13 and 14 illustrates various configurations for connecting the spar element to the shear web by resin infusion process.

DETAILED DESCRIPTION

Reference now will be made in detail to embodiments of the invention, one or more examples of which are illustrated in the drawings. Each example is provided by way of explanation of the invention, not limitation of the invention. In fact, will be apparent to those skilled in the art that various modifications and variations can be made in the present invention without departing from the scope or spirit if the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

FIG. 2 shows a schematic view of a rotor blade 28. The rotor blade 28 has the shape of a conventional wind turbine blade and comprises a root region 19 closest to the hub, a profiled or an airfoil region 34 farthest away from the hub and a transition region 32*d* between the root region 19 and the airfoil region 32*c*. The blade 28 comprises a leading edge facing the direction of rotation of the blade 28, when the blade 28 is mounted on the hub, and a trailing edge facing the opposite direction of the leading edge.

The airfoil region 32*c* (also called the profiled region) has an ideal or almost ideal blade shape with respect to generating lift, whereas the root region 19 due to structural considerations has a substantially circular or elliptical cross-section, which for instance makes it easier and safer to mount the blade 28 to the hub. The diameter (or the chord) of the root region 19 may be constant along the entire root area. The transition region 32*d* has a transitional profile gradually changing from the circular or elliptical shape of the root region 19 to the airfoil profile of the airfoil region. The chord length of the transition region 32*d* typically increases with increasing distance r from the hub. The airfoil region has an airfoil profile with a chord extending between the leading edge and the trailing edge of the blade 28. The width of the chord decreases with increasing distance r from the hub.

A shoulder 32*e* of the blade 28 is defined as the position, where the blade 28 has its largest chord length. The shoulder is typically provided at the boundary between the transition region 32*d* and the airfoil region. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a first shell half structure and a second shell half structure that are glued to each other along bond lines at the leading edge and the trailing edge of the blade 28.

Referring now to FIG. 3, a schematic view of a cross section of one of the rotor blades 28 of FIG. 1 is illustrated. In an embodiment, the rotor blade 28 may hereinafter alternatively be referred as blade. As shown, the rotor blade 28 may include a tip end segment 30 and a root end segment 32. Further, as shown, the tip end segment 30 of the blade 28 and the root end segment 32 of the blade 28 may each extend in opposite directions from a chordwise joint 34. In addition, as shown, each of the blade segments 30, 32 may include at least one shell member defining an airfoil surface, such as a first shell half structure and a second shell half structure. The tip end segment 30 and the root end segment 32 are connected by at least an internal support structure 36 to facilitate joining of the tip end segment 30 and root end segment 32. The arrow 38 shows that the segmented rotor blade 28 in the illustrated example includes the tip end segment 30 and the root end segment 32 and are joined by inserting the internal support structure 36 into the root end segment 32. In addition, as shown, the root end segment includes multiple spar structures 66 (also referred to herein as spar caps) that extend lengthwise for connecting with the beam structure 40 of the tip end segment 30 (which is shown in more detail in FIGS. 3 and 5).

Referring now to FIG. 4, a perspective view of a section of the tip end segment 30 according to the present invention is illustrated. As shown, the tip end segment 30 includes a beam structure 40 that forms a portion of the internal support structure 36 and extends lengthwise for structurally connecting with the root end segment 32. Further, as shown, the beam structure 40 forms at least a part of a shear web 42 (i.e. shear web on the tip end segment of the blade) connected with a suction side spar cap 44 and a pressure side spar cap 46. Moreover, as shown, the tip end segment 30 may include one or more first pin joints at a receiving end 54 of the beam structure 40. In one embodiment, the pin joint may include a pin that is in a tight interference fit with a bushing. More specifically, as shown, the pin joint(s) may include at least one pin tube 52 located on the receiving end 54 of the beam structure 40. Thus, as shown, the pin tube 52 may be oriented in a span-wise direction. Further, the tip end segment 30 may also include a pin joint slot 50 located on the beam structure 40. Moreover, as shown, the pin joint slot 50 may be oriented in a chord-wise direction.

Referring now to FIG. 5, a perspective view of a section of the root end segment 32 according to the present invention is illustrated. As shown, the root end segment 32 includes a spar element 60*a*. The spar element 60*a* may be defined with a receiving section 60. The receiving section 60 of the spar element 60*a* may extend lengthwise to a predetermined length within the root end segment 32 for receiving the beam structure 40 of the tip end segment 30. Further, as shown, the receiving section 60 may include the spar structures 66 that extend lengthwise for connecting with the beam structure 40 of the tip end segment 30. In addition, as shown, the receiving section 60 may include a chord-wise member 48 [as can be seen in FIG. 6] having a span-wise pin joint slot 56 defined therethrough. Moreover, as shown, the receiving section 60 may include a chord-wise pin joint slot 58 defined therethrough that aligns with the pin joint slot 50 of the beam structure 40.

Referring now to FIG. 6, an assembly 70 of the rotor blade 28 having the tip end segment 30 joined with the root end segment 32 according to the present invention is illustrated. As shown, the assembly 70 illustrates multiple supporting structures beneath outer shell members of the rotor blade 28 having the tip end segment 30 joined with the root end segment 32. More specifically, as shown, the span-wise extending pin 52 of the receiving end 54 of the beam structure 40 is received within the span-wise pin joint slot 56 of the receiving section 60 so as to secure the first and second blade segments 30, 32 together. Referring now to FIG. 6, an exploded perspective view of the multiple supporting structures of the assembly 70 towards the receiving section 60 of the rotor blade 28 is illustrated. As shown, the spar structures 66 are configured to receive the beam structure 40) and may include the chord-wise pin joint slot 58 that align with the pin joint slot 50 of the beam structure 40 through which a chord-wise extending pin 62 may be inserted. Further, as shown, the chord-wise extending pin 62 may be configured to remain in a tight interference fit within the aligning pin joint slots 50, 58 such that spar structures 66 and the beam structure 40 are joined during assembly. Further. FIG. 6 also illustrates the chord-wise member 48 that includes the pin joint slot 56 configured for receiving the pin tube 52 (also referred to herein as the span-wise extending pin 52) of the beam structure 40. As such, the pin tube 52 is configured to form a tight interference fit pinned joint.

Exemplary cross-sectional shapes of spar element 60*a* are shown in FIGS. 8A to 8C. FIG. 8A shows a spar element 60*a* having a rectangular cross-section. It should be understood that also a square cross-section is comprised within the meaning of the term 'rectangular'. According to another embodiment of the present invention shown in FIG. 8B, the spar element 60*a* has an elliptical cross-section. It should be understood that also a circular cross-section is comprised within the meaning of the term 'elliptical'. An even further embodiment of the present invention is shown in FIG. 8C. Therein, the cross-sectional shape of spar element 60*a* is adjusted to the cross-sectional shape of the wind turbine rotor blade 28. The cross-sectional shape is basically rectangular, but the upper and lower connecting surfaces are curved so as to follow the shape of the blade shells. Although FIGS. 8A to 8C show the cross-sectional shape of spar element 60*a*, it should be understood that the cross-sectional shapes of beam structure 40 will be selected to correspond with the cross-sectional shape of receiving section 60. In some embodiment, the spar element 60*a* may be a multi-piece receiver section. As shown in FIG. 8D, the receiver section may be prefabricated into two halves. In further embodiments of the disclosure, the method of adhering the receiving section 60 to the at least one of the first shell half structure or the second shell half structure of the wind turbine blade 28 is substantiated with reference to FIGS. 9 and 10.

Referring now to FIGS. 9 and 10, which illustrates method of manufacturing the wind turbine blade 28 including the spar element 60*a*. In an embodiment, the first shell half structure and the second shell half structure of the wind turbine blade 28 may be manufactured by a moulding process using a mould 103. FIG. 11*a* illustrates a schematic side view of a mould 103 for manufacturing shell half structures of the wind turbine blade 28. In addition to the method substantiated hereinbelow, the method is also depicted in the way of flowcharts in the FIGS. 11*b* and 11*c*. The pressure and suction side shells of the wind turbine blade 28 are manufactured using the mould 103 as shown in FIG. 11*a*. The mould 103 may be defined with an outer surface 103*a* and an inner surface 103*b*. The inner surface of the mould 103 is aerodynamic. In an embodiment, the first shell half structure 30*a* and 32*a*, and the second shell half structure 30*b* and 32*b* for the root end segment 32 and the tip end segment 30 may be manufactured in a single mould 103. Initially, a blade gel coat or primer is typically applied to the inner surface 103*b* of the mould 103. Further, fiber reinforcement and/or fiber fabrics are placed into the inner surface 103*b* of the mould 103. A plurality of layers of fibers may be positioned on the inner surface 103*b* of the mould 103. In an embodiment, the plurality of layers of fibers may include aramid fiber fabrics, glass fibers, carbon fiber fabrics or hybrid fiber fabrics made of glass and carbon. Other, fiber fabrics not limiting to the above-mentioned fabrics which are known in the art may also be used. In some embodiments, the fibers used may be in any form such as but not limiting to fabrics, prefabricated structures such as pultrusion's or loose fibers.

Upon placing the plurality of layers of fibers on the mould, the spar element 60*a* may be positioned on the at least one of the first shell half structure 32*a* or the second shell half structure 32*b* of the root end segment 32 of the blade 28. In an embodiment, the spar element 60*a* may be positioned proximal to the chord-wise joint 34. The spar element 60*a* may be configured to receive the beam structure 40 and may also be referred to as spar beam receiver section. In a preferred embodiment, the spar element 60*a* may be a prefabricated structure. The spar element 60*a* is positioned preferably on the first shell half structure 32*a* of the root end segment 32. Further, a vacuum bag 100 may be used to seal and close the mould comprising the plurality of layers of fibers and the spar element 60*a*. A high vacuum pump may be used to remove air in a cavity created by the vacuum bag 100 and the mould [not shown] to eliminate or expel air from the cavity and consolidate the plurality of layers of fibers and the spar element 60*a*. Upon sealing the plurality of layers of fibers and the spar element 60*a*, a resin may be infused through the cavity created by the vacuum bag 100 and the mould. The resin infused may flow through the cavity and wet the plurality of layers of fibers. Also, the infused resin flows between the plurality of layers of fibers and the spar element 60*a*. The infused resin is allowed to cure before the vacuum bag 100 is removed from the mould. This process is herein also referred to as resin infusion process. In a preferred embodiment, the mould of the first shell half structure 32*a* and the second shell half structure 32*b* may be closed and the resin may be infused to the plurality of layer of fibers and the spar element 60*a* and the resin is allowed to cure. In this condition, sealing flanges of the mould when closed together may be configured to act as vacuum bag to aid in resin infusion. The above-described process ensures that the spar element 60*a* is formed as an integral part of the first shell half structure 32*a* of the root end segment 32 of the blade 28. The spar element 60*a* may be adhered to the first shell half structure 32*a* of the blade 28 without the use of conventional adhesive bonds. It should be understood that the spar element 60*a* may also be positioned on the second shell half structure 32*b* of the root end segment 32 of the blade 28 and may be adhered to the second shell half structure 32*b*. Positioning of the spar element 60*a* on the first shell half structure 32*a* should by no means be construed as a limitation of the present invention.

In an embodiment of the disclosure, the spar element 60*a* may be adhered to at least one of the first shell half structure 32*a* and the second shell half structure 32*b* on the root end segment 32 that may be prefabricated. The method of adhering the spar element 60*a* to the prefabricated blade 28 is substantiated hereinbelow. At least one of the first shell half structure 32*a* or the second shell half structure 32*b* of the root end segment 28 may be placed in the mould. The spar element 60*a* is positioned over at least one of the first shell half structure 32*a* or the second shell half structure 32*b* which is prefabricated. In the present invention and for ease of substantiating, the spar element 60*a* may be considered to be placed on the first shell half structure 32*a* of the root end segment 32 of the blade 28. A portion of the spar element 60*a* which may come in contact with the first shell half structure 32*a* may be defined with a flow path. The flow path may be configured to facilitate flow of the resin between a portion of the first shell half structure 32*a* at which the spar element 60*a* is positioned and the spar element 60*a*. In an embodiment, the flow path may be created by using fluid flow media such as but not limiting to fiber mats or any other suitable means. Once the spar element 60*a* is positioned over the first shell half structure 32*a*, the resin is infused through the flow path defined on the portion of the spar element 60*a* and is allowed to cure. The spar element 60*a* may be adhered to the first shell half structure 32*a* upon complete curing of the resin. In an embodiment, the spar element 60*a* may be adhered to a spar cap of the blade 28. The spar element 60*a* may be adhered to the spar cap by resin infusion process. The said process eliminates the use of conventional adhesive bonds which lead to high concentrated loads. In an embodiment, the resin may include a polyester compound such as but not limiting to an unsaturated polyester compound. In an embodiment, the resin used for infusion in the present disclosure is at least one of vinyl ester or epoxy resin.

In some embodiment and as illustrated in FIG. 8D, each of the two halves of the spar element 60*a* may be positioned on each of the first shell half structure 32*a* and the second shell half structure 32*b* [illustrated in dotted lines] of the wind turbine blade 28. For example, a first half of the spar element 60*a* may be positioned on the first shell half structure 32*a* and a second half of the spar element 60*a* may be positioned on the second shell half structure 32*b*. In an embodiment, the two halves of the spar element 60*a* may be positioned at a predetermined position on the first shell half structure 32*a* and second shell half structure 32*b*. The pre-determined position described herein above may be proximal to the chord-wise joint 34 on the first and second shell half structures 32*a* and 32*b*. In some embodiments, predetermined position may be spar cap region in the wind turbine blade 28. The surface of the two halves of the spar element 60*a* that may come in contact with the shell 32*a* and 32*b* may be defined with a flow path. Once the two halves of the spar element 60*a* are placed over the respective shells 32*a* and 32*b*, resin may be infused in between the shells 32*a* and 32*b* and the two halves of the spar element 60*a*. The resin may be infused through the flow path defined on each of the two halves of the spar element 60*a*. The infused resin may be subsequently allowed to cure, thereby adhering the two halves of the spar element 60*a* to the respective shells 32*a* and 32*b*. In another embodiment, the two halves of the spar element 60*a* may be positioned over spar caps. Each of the two halves of the spar element 60*a* may be adhered to the respective spar caps by resin infusion process. Once the resin is cured and the each of the two halves of the spar element 60*a* is adhered to the respective spar caps, the spar caps are positioned on the first shell half structure 32*a* and second shell half structure 32*b* at a pre-determined position. The spar caps may be adhered to the first shell half structure 32*a* and second shell half structure 32*b* by the resin infusion process. Further, the two halves of the spar element 60*a* may be adhered to one another by any conventional joining process including but not limiting to adhesive bonding.

In an embodiment, as shown in FIG. 12, an end opposite to the receiving section 60 of the spar element 60*a* may be adhered or joined to a shear web 102 on the root end segment 32 of the wind turbine blade 28. The shear web 102 may be positioned at a substantially central portion on at least one of the first shell half structure 32*a* or the second shell half structure 32*b*. The shear web 102 may extend along the length blade 28 from the root end and up-to the spar element 60*a*. In some embodiments, the shear web 102 may be connected to at least one of the first shell half structure 32*a* or the second shell half structure 32*b* by at least one of adhesive bond or resin infusion process. As depicted in FIG. 12. the end of the spar element 60*a* opposite to the receiving section may be connected to the shear web 102 of the blade 28 by the resin infusion process. The resin may be infused in a space between the end of spar element 60*a* and the shear web 102.

Typical ways of joining the shear web 102 with the spar element 60*a* are shown in FIG. 13 (*a*) to 14 (*d*). According to some embodiments of the present invention, the spar element 60*a* may be defined with an extending portion on the end opposite to the receiving portion 60. The extending portion may be configured to connect to the shear web 102 of the blade 28. FIG. 13 (*a*) to (*d*) shows the extended portion of the spar element 60*a* that may be connected with the shear web 102 of the root end segment 32. As shown in FIG. 13 (*a*), the root end segment 32 of the blade 28 may include multiple shear web 102 extending parallelly from the root region of the blade up to the spar element 60*a*. The parallelly running shear webs 102 are then adhered to the spar element 60*a* by the resin infusion process, thus forming a co-infused joint between the spar element 60*a* and the shear web 102. According to another embodiment of the present invention, as shown in FIGS. 13 (*b*) and 13 (*c*), the root end segment 32 of the blade 28 may include a single shear web 102 extending from the root region of the blade 28 to the spar element 60*a*. The single shear web may be adhered to the spar element 60*a* by a Y-shaped joint member as shown in FIG. 13 (*b*). Also, as shown in FIG. 13*c*, the shear web 102 may extend into a portion of the spar element 60*a*. In both cases i.e. embodiments according to FIGS. 13 (*b*) and 13 (*c*), the resin may be infused between the spar element 60*a* and the shear web 102 to form the co-infused joint. An even further embodiment of the present invention is shown in FIG. 13 (*d*), here the ends of the spar element 60*a* may be abutted against the shear web 102 and the resin may be infused between the shear web 102 and the spar element 60*a*. In some embodiments and as shown in FIG. 8D, the spar element 60*a* may be defined with a scarf region. The scarf region may be configured to be connected to the shear web 102 and the spar cap by a resin infusion process. In a preferred embodiment, the resin may be infused in the gap formed between the shear web 102 and the spar element 60*a* [i.e. the process of joining the shear web and the spar element according to FIGS. 12 and 13]. A flow media such as but not limiting to fiber mat may be positioned in the gap between the shear web 102 and the spar element 60*a*. The resin may then be infused through the flow media to the gap and may be allowed to cure. Upon curing the resin bonds both the spar element 60*a* and the shear web 102 together to obtain a resin infused joint.

In some embodiments, the shear web 102 may be directly connected to the end of the end of the spar element 60*a* as shown in FIGS. 14 (*a*) to (*d*). As shown in FIGS. 14 (*a*) and 14 (*b*), at least one corner of the end of the spar element 60*a* may be chamfered. The chamfered portion on the spar element 60*a* may accommodate the ends of the shear web 102. The ends of the shear web 102 that may be connected to the spar element 60*a* may also be counter chamfered. The resin may be infused in the space between the chamfered portion of the shear web 102 and the spar element 60*a* to adhere the shear web 102 to the spar element 60*a*. According to another embodiment of the present invention as shown in FIGS. 14 (*c*) and 14 (*d*), the shear web 102 of the root end segment 32 may be abutted against the end of the spar element 60*a*. The resin may be infused in space between the shear web 102 and the spar element 60*a*, thereby adhering the spar element 60*a* to the shear web 102 upon curing of the resin. However, the above methods should not be construed as a limitation to the present invention.

Upon positioning the spar element 60*a*, shear web 102 and other blade components on the at least one of the first shell half structure 32*a*, the second shell half structure 32*b* may be adhered to the first shell half structure 32*a*. In an embodiment, before adhering the second shell half structure 32*b* to the first shell half structure 32*a*, the surfaces of the spar element 60*a*, and other blade components facing the second shell half structure 32*b* may be applied with adhesives. Subsequently, before lowering the second half shell structure 32*b* on to the first half shell structure 32*a*, adhesive is applied over the leading edge and the trailing edge. Once the adhesive is applied on the leading edge and the trailing edge the second half shell structure 32*b* may be lowered over the first shell half structure 32*a*. Upon bonding the first shell half structure 32*a* and second shell half structure 32*b*, the adhesive may be allowed to cure to obtain the root end segment 32 of the blade 28. Further, the blade 28 is removed from the mould and the excess material may be trimmed. In some embodiments, the spar elements 60*a*, shear web 102 and other blade components may be adhered by the resin infusion process on at least one of the shells 32*a* and 32*b* which undergoes more pressure during operation. In an embodiment, the said resin infusion method may also be used to adhere beam structure 40 in the tip end segment of the blade 30.

In an embodiment, the use of resin infusion process for adhering the spar element 60*a* may reduce the concentrated load at the chord-wise joint 34 of blade 28 unlike the conventional adhesive bond process. The structural properties of blade at the chord-wise joint doesn't change by the use of resin infusion process which is not in case of the conventional adhesive bonds. The resin infused joints may significantly increase potential strength of tip end segment 30 of the blade 28. Also, the elimination of adhesive bonds reduces the blade mass, cost and significantly increases the robustness and reliability. Also, use of resin infusion process does not limit the design feature unlike the adhesive bonds.

The invention is not limited to the embodiments described herein and may be modified or adapted without departing from the scope of the present invention.

LIST OF REFERENCE NUMERALS

10 Wind turbine
12 Tower
14 Support surface
16 nacelle
17 Blade tip
18 Generator
19 Blade root end
20 Gear box
22 Rotor
24 Rotor shaft
26 Rotatable hub
28 Wind turbine blade or Rotor blade
30 Tip end segment
32 Root end segment
32*a* First shell half structure of root end segment
32*b* Second shell half structure of root end segment
32*c* Airfoil region
32*d* Transition region
32*e* shoulder
34 Chord wise joint
36 Internal support structures
38 Arrow
40 Beam structure
42 Shear web on tip end segment
44 and 46 Spar cap
48 Chord wise member
50 Pin Joint slot
52 Span-wise extending pin
54 Receiving end
56 Span-wise pin joint slot
58 Chord-wise pin joint slot
60 Receiving section
60*a* Spar element
60*b* Extended portion of the spar element
62 Chord-wise extending pin
66 Spar structures
100 Vacuum bag
102 Shear web for root end segment and configuration of shear web
103 Mould
103*a* and 103*b* outer and inner surface of the mould respectively

We claim:

1. A method of manufacturing a shell of a wind turbine blade, the method comprising:
- forming a first shell half structure and a second shell half structure separately in a mould;
- positioning a first half of a spar element at a first predefined position on the first shell half structure and a second half of the spar element at a second predefined position on the second shell half structure, wherein the spar element is a spar beam receiver section or a portion of a spar beam receiver section, and wherein the spar beam receiver section is configured to receive a beam structure of a blade segment;
- sealing the first half of the spar element and the first shell half structure and separately sealing the second half of the spar element and the second shell half structure;
- infusing resin through the first shell half structure and the first half of the spar element and subsequently curing the same to adhere the first half of the spar element to first shell half structure;
- infusing resin through the second shell half structure and the second half of the spar element and subsequently curing the same to adhere the second half of the spar element to second shell half structure;

adhering the first half of the spar element to the second half of the spar element; and then, joining and sealing the first shell half structure and the second shell half structure.

2. The method according to claim 1, further comprising positioning a shear web at a central portion of the shell, wherein the shear web extends along a length of the shell and up to the spar element.

3. The method according to claim 2, wherein an end of the spar element is connected to the shear web.

4. The method according to claim 2, further comprising joining an end of the spar element and the shear web by a resin infusion process.

5. A method for joining a spar element to a wind turbine blade, the method comprising:

positioning a first half of the spar element on a first shell half structure or a first spar cap of the wind turbine blade and positioning a second half of the spar element on a second shell half structure or a second spar cap of the wind turbine blade, wherein the spar element is a spar beam receiver section or a portion of a spar beam receiver section, and wherein the spar beam receiver section is configured to receive a beam structure of a blade segment; and infusing resin between the first half of the spar element and the first shell half structure or the first spar cap and subsequently curing the same to adhere the first half of the spar element to the first shell half structure or the first spar cap of the wind turbine blade;

infusing resin between the second half of the spar element and the second shell half structure or the second spar cap and subsequently curing the same to adhere the second half of the spar element to the second shell half structure or the second spar cap of the wind turbine blade;

adhering the first half of the spar element to the second half of the spar element; and then, joining and sealing the first shell half structure and the second shell half structure.

6. The method according to claim 5, wherein the resin includes a polyester compound.

7. The method according to claim 6, wherein the resin includes at least one of a vinyl ester or epoxy resins.

8. A method for manufacturing a root end segment of a wind turbine blade, the method comprising:

forming a first shell half structure and a second shell half structure separately in a mould;

joining, by a resin infusion process in the mould, a first half of a spar element to the first shell half structure and joining, by the resin infusion process in the mould, a second half of the spar element to the second shell half structure, wherein the spar element is a spar beam receiver section or a portion of a spar beam receiver section, and wherein the spar beam receiver section is configured to receive a beam structure of a blade segment;

positioning a shear web at a central portion of the first shell half structure and the second shell half structure, wherein the shear web extends in a spanwise direction up to the spar element;

joining an end of the spar element and the shear web;

joining and sealing the first shell half structure and the second shell half structure to obtain the root end segment of the wind turbine blade; and adhering the first half of the spar element to the second half of the spar element before the joining of the first shell half structure and the second shell half structure.

9. The method according to claim 8, wherein the spar element is defined with an extending portion on an end opposite to the spar beam receiver receiving section, the extending portion being configured to connect to the shear web.

10. The method according to claim 8, wherein the first shell half structure and the second shell half structure are formed by laying a plurality of layers of fiber in the mould, infusing resin and subsequently curing the resin.

11. The method according to claim 10, wherein the resin includes a polyester compound.

12. The method according to claim 11, wherein the resin includes at least one of a vinyl ester or epoxy resins.

13. The method according to claim 11, wherein the plurality of layers of fiber at least partially comprise glass fibers.

* * * * *